(12) United States Patent
Heller

(10) Patent No.: US 9,758,948 B2
(45) Date of Patent: Sep. 12, 2017

(54) HUMIDITY COLLECTOR APPARATUS

(71) Applicant: Philip Heller, Houston, TX (US)

(72) Inventor: Philip Heller, Houston, TX (US)

( * ) Notice: Subject to any disclaimer, the term of this patent is extended or adjusted under 35 U.S.C. 154(b) by 586 days.

(21) Appl. No.: 14/067,641

(22) Filed: Oct. 30, 2013

(65) Prior Publication Data

US 2014/0096548 A1     Apr. 10, 2014

Related U.S. Application Data

(63) Continuation-in-part of application No. 13/647,790, filed on Oct. 9, 2012, now abandoned.

(51) Int. Cl.
*E03B 3/28* (2006.01)

(52) U.S. Cl.
CPC ............ *E03B 3/28* (2013.01); *Y10S 514/838* (2013.01); *Y10S 514/869* (2013.01); *Y10S 514/87* (2013.01); *Y10S 514/893* (2013.01)

(58) Field of Classification Search
CPC .............. E03B 3/28; F25B 27/00; F25B 7/00
USPC .................................................. 62/150, 175
See application file for complete search history.

(56) References Cited

U.S. PATENT DOCUMENTS

| | | | |
|---|---|---|---|
| 727,650 A | 5/1903 | Linde | |
| 728,173 A | 5/1903 | Linde | |
| 2,888,808 A | 6/1959 | Jacobs | |
| 2,991,632 A | 7/1961 | Rogers | |
| 3,368,364 A | 2/1968 | Norton et al. | |
| 3,733,845 A * | 5/1973 | Lieberman | F25B 9/006 62/114 |
| 4,840,039 A * | 6/1989 | Kazuhiko | B60H 1/3205 62/180 |
| 2008/0245083 A1* | 10/2008 | Tutunoglu | F24F 11/0086 62/115 |

* cited by examiner

*Primary Examiner* — Marc Norman
(74) *Attorney, Agent, or Firm* — David McEwing

(57) ABSTRACT

A device that collects water vapor, from the ambient air, through condensation or deposition, on the surface of its unique heat exchangers, which are embodied with opposing intertwined and alternating refrigeration circuits. In a dual refrigeration circuit/dual heat exchanger configuration, one refrigeration circuit is responsible for freezing heat exchanger A and heating heat exchanger B while the other refrigeration circuit is responsible for heating heat exchanger A and freezing heat exchanger B. The alternating refrigeration circuits work together to intermittently freeze then thaw each heat exchanger. The water run-off from the thawing process is then collected for use. The condenser tubes of one refrigeration circuit are positioned proximate to the evaporator tubes of the second refrigeration circuit to facilitate the exchange of heat. The system may further comprise heat exchanger fins in contact with the tubes. Multiple pairs of heat exchangers may be utilized.

11 Claims, 8 Drawing Sheets

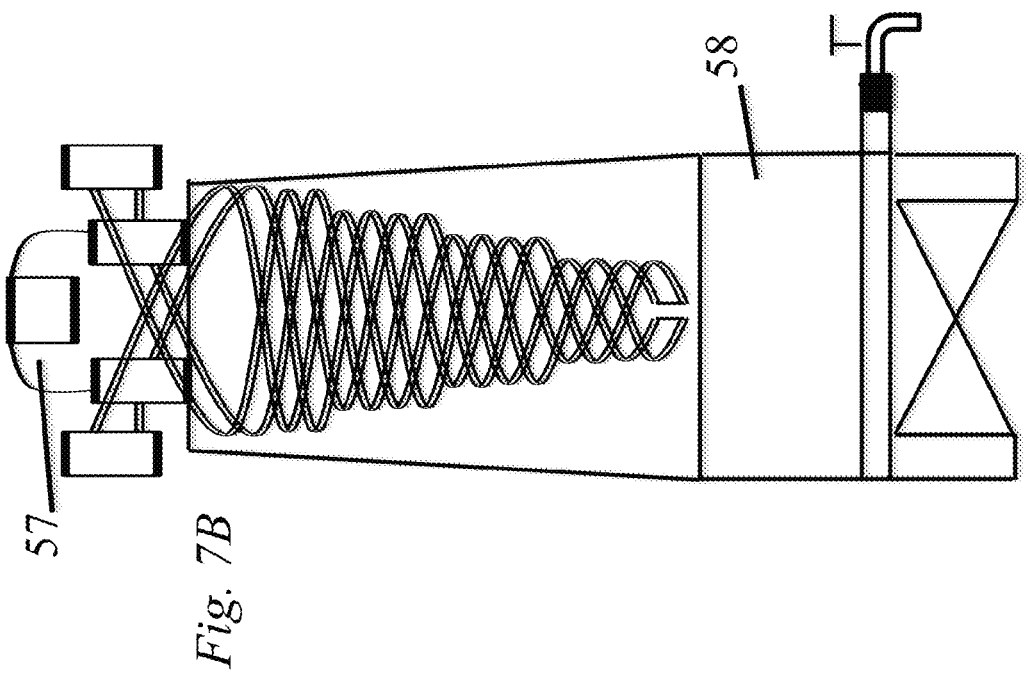
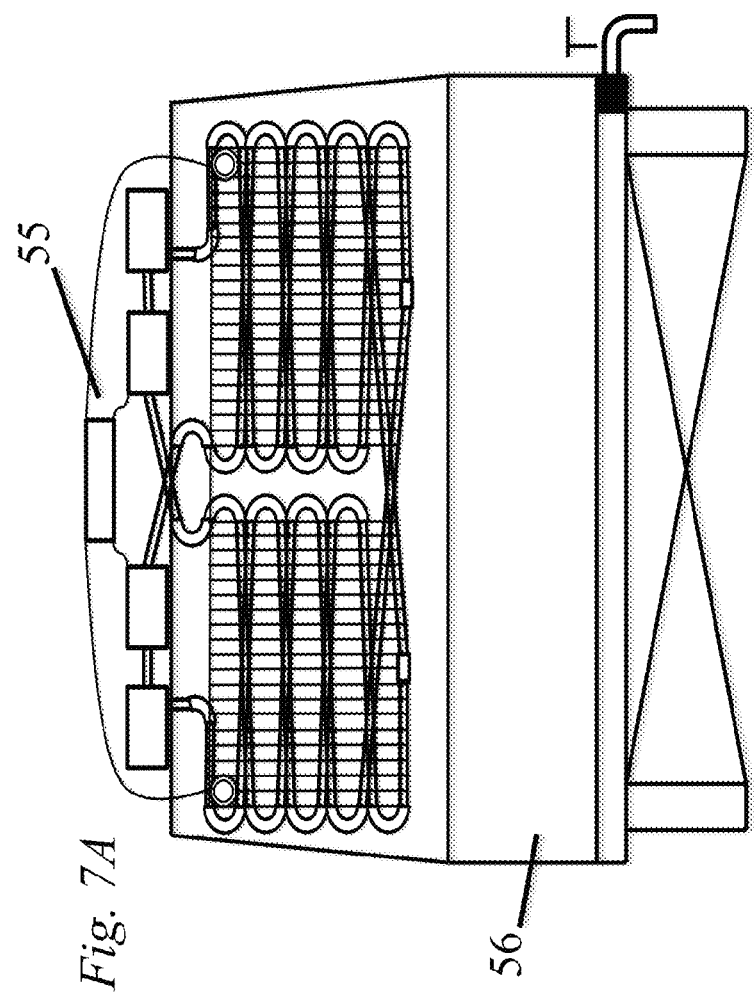
Fig. 7

HUMIDITY COLLECTOR APPARATUS

CROSS-REFERENCE TO RELATED APPLICATION

This Application is a Continuation in Part of application Ser. No. 13/647,790 entitled Clearwater Humidity Collector filed Oct. 9, 2012, which is hereby incorporated herein by reference in its entirety.

FIELD OF THE INVENTION

This invention relates in general to atmospheric water collection, more specifically capturing ambient water vapor in atmospheric air through deposition or condensation.

BACKGROUND OF THE INVENTION

It has been an ever-increasing concern that population growth will or has depleted the available water supply for many regions. Subsequently, the cost for water in these areas has increased monetarily as well as socially. Numerous developed and underdeveloped regions across the world face constraints in supplying water for human consumption and agriculture. The developed world finds itself supplying a larger and lager population, needing more food in turn more water to support its growth.

Many people are losing, or have lost, the ability compete for commodities such as water. As the price for water increases, the cost of production increases and net profits decrease. Furthermore, many impoverished people usually base their trade and their very livelihood on agriculture. Without ample water, the essential building block for growth is lost, resulting in a downward spiral on social structure.

Current methods for producing water include processes such as water extraction through desalination, the removing of salt from saltwater, and water extraction through air compression, the removing of water from condensed air. All of which produce an expensive end product due to high fixed costs and routine maintenance.

BRIEF SUMMARY OF THE INVENTION

This invention provides a cost effective alternative for clean water production in areas with inadequate water supply. The supply can be used both for consumption and agriculture. The device utilizes the law of deposition (the physical transition phase from a gas to solid) or condensation (the physical transition phase form a gas to liquid) by way of exposing its heat exchangers to the surrounding atmosphere, capturing ambient water vapor through a freezing and thawing process. The heat exchanger's key distinct function is that it can both be heated and cooled by way of manipulating the respective embodied refrigeration circuits. In one embodiment, the device utilizes two separate tube systems (or refrigeration circuits) making up two separate heat exchangers. Each tube system (first and second tube systems) has a condensing zone that creates heat by way of a compressor, an expansion valve (or pressure relief valve) and an evaporating zone that creates chill. Each heat exchanger is comprised of opposing tube systems, both a heating and cooling zone. The opposing tube systems are dimensioned to fit proximate to each other. The alternating operations of the tube systems work in tandem to intermittently freeze and thaw the heat exchangers. While one heat exchanger is in the freezing process, the other is in a thawing process. Ambient water vapor is captured via deposition or condensation on the evaporating zone of the tube system in operation. The proximate condensing zone of the alternate tube system then heats the captured water, facilitating the water to fall into a reservoir. In another embodiment, the device utilizes two separate tube systems to make up one single heat exchanger where the opposing tube systems are dimensioned in a concentric helically shaped manner. Each tube system's condensing zone is positioned below and runs parallel to the evaporating zone of the same refrigeration circuit. The proximate location of the evaporating zone to the condensing zone facilitates the captured water to collect, through deposition or condensation, then immediately run off without an intermittent stage of freezing then thawing. Each tube system (or refrigeration circuit) is positioned proximate to the opposing tube system to enable additional heat transfer between the two. To facilitate water run-off in an efficient manner, this embodiment can also alternate each refrigeration circuit one at a time or both refrigeration circuits at the same time.

BRIEF DESCRIPTION OF THE DRAWING

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 7A illustrates the scalability of the invention described in FIG. 1 positioned over a reservoir tank.

FIG. 7B illustrates the scalability of the invention described in FIG. 6 positioned over a reservoir tank.

DETAILED DESCRIPTION OF THE INVENTION

By and large this invention offers an alternative method for water production by extracting ambient water vapor from atmospheric air through condensation or deposition. Condensation describes the collection of liquid water on chilled pipes or heat exchanger cooled by such pipes. Deposition describes the deposit of crystalline water or ice on the chilled pipes or heat exchanger.

Figure 1:
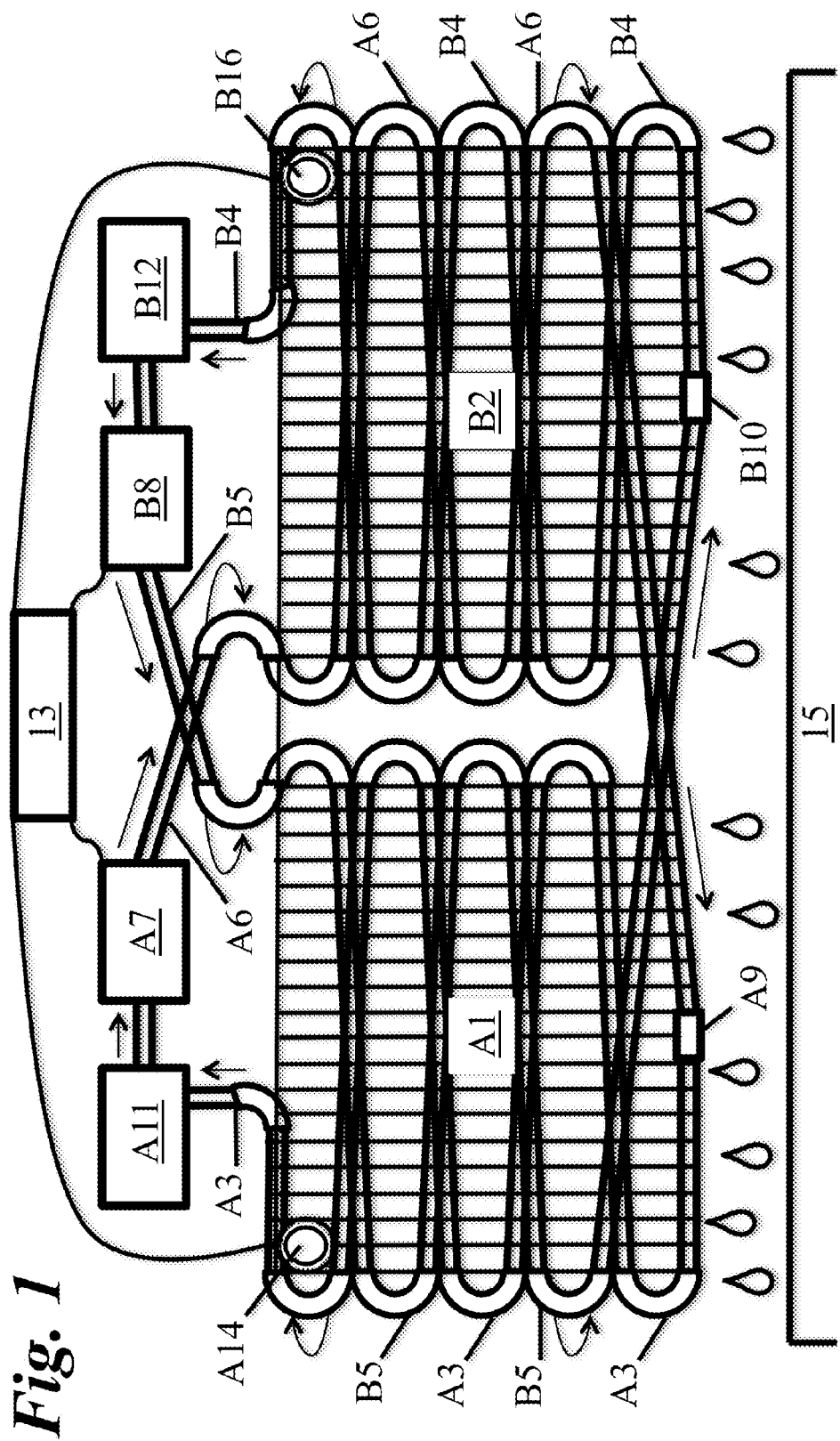
FIG. 1 is a front view of a dual circuit/dual heat exchanger of the disclosure. As more fully described herein, it comprises of two tube systems (or refrigeration circuits) operating in tandem. A compressor operates each tube system. Each tube comprises a condenser line, an expansion valve and an evaporator line.

As seen in FIG. 1, two refrigeration circuits are utilized to make up two separate heat exchangers A1 and B2, which produce an artificial environment by altering natural dew point levels at the surface of each heat exchanger. Stated differently, the circuits create a surface having a temperature below the ambient dew point.

The heat exchanger's intertwined alternating refrigeration circuits provide a distinct advantage by using their respective circulations (represented in the drawing by the directional arrows) in a symbiotic manner to capture ambient water vapor from the surrounding atmospheric air. Specifically two refrigeration circuits (or tube loop components) are intertwined and circulate in opposite directions. That is, the evaporator lines A3, B4, which create frost, are intertwined with the opposing condenser lines B5, A6, which create heat. Each tube loop component starts at a compressor A7, B8 and extends to a respective heat exchanger B2, A1 via a condenser line A6, B5. Once at the expansion valve A9, B10 the tube loop components cross over to the opposite heat exchanger A1, B2 via an evaporator line A3, B4. From the evaporator, the tube loop component extends to an accumulator A11, B12 and back to the compressor A7, B8. The opposing circuits produce an interdependent mechanism that captures water vapor by separating it from the surrounding atmospheric air and converting it into liquid water. The evaporator portion of the circuit captures water vapor, separating it from the surrounding atmospheric air through deposition or condensation by cooling the heat exchanger. The opposing condenser portion of the circuit heats the heat exchanger, facilitating the removal of the captured frost or water from the evaporator portion and from the heat exchanger as a whole. The proximity of the evaporator portion of the heat exchanger to the condenser portion of the heat exchanger is fundamental in producing the proper and rapid heat exchange between the two.

This device is controlled by and powered through the automatic closed transition transfer switch 13, which initially activates the first refrigeration circuit by activating compressor A7 to circulate its refrigerant solution that is stored in accumulator A11. The first refrigeration circuit (comprising compressor A7, accumulator A11, condenser line A6, expansion valve A9 and evaporator line A3) initially heats heat exchanger B2 by way of condenser line A6, which emits or exhausts heat from the compressed gas within its tubing. After the refrigerant solution or compressed gas passes through expansion valve A9 to evaporator A3, the pressure and temperature of the gas decreases, so much so that frost begins to collect on the outside surface of evaporator A3, increasing the chill experienced by heat exchanger A1. Once frost reaches the top of heat exchanger A1 (by the continuation of expanded gas across evaporator A3) to the point where it meets electronic freeze-stat A14 (or temperature sensor), the frost chills the sensor activating it to trigger the automatic closed transition transfer switch 13 to open ("turn off") the electrical connection of the first refrigeration circuit and close ("turn on") the electrical connection to the second refrigeration circuit. This activates compressor B8 to circulate its refrigerant solution that is stored in accumulator B12.

The now activated second refrigeration circuit (comprising compressor B8, accumulator B12, condenser line B5, expansion valve B10 and evaporator line B4) initially heats heat exchanger A1 via condenser B5 from the compressed gas within its tubing, thawing the frozen water that has collected from the initial freezing of evaporator A3. The liquid water then falls into water a collection reservoir 15. After the refrigerant solution or compressed gas passes through expansion valve B10 to evaporator B4, the pressure and temperature of the gas decreases so much so that frost begins to collect on the outside surface of evaporator B4, increasing the chill experienced by heat exchanger B2. Once frost reaches the top of heat exchanger B2 (by the continuation of expanded gas across evaporator B4) to the point where it meets electronic freeze-stat B16, the frost chills the sensor activating it to trigger the automatic closed transition transfer switch 13 to open ("turn off") the electrical connection of the second refrigeration circuit and close ("turn on") the electrical connection to the first refrigeration circuit, starting the process over.

In another embodiment of the invention, a hygrometer (e.g. electronic humidity sensor or a thermal conductivity humidity sensor) could be used in place of the transfer switch and electronic freeze-stats. A hygrometer is a device that detects variations in humidity levels in the atmosphere. Depending on atmospheric conditions a hygrometer, in conjunction with a computer/memory card and a transfer switch, determines the rate in which it transitions power to any given refrigeration circuit. The use of a hygrometer may produce a more effective yet more expensive device compared to a transfer switch/freeze-stats configuration.

Figure 2:
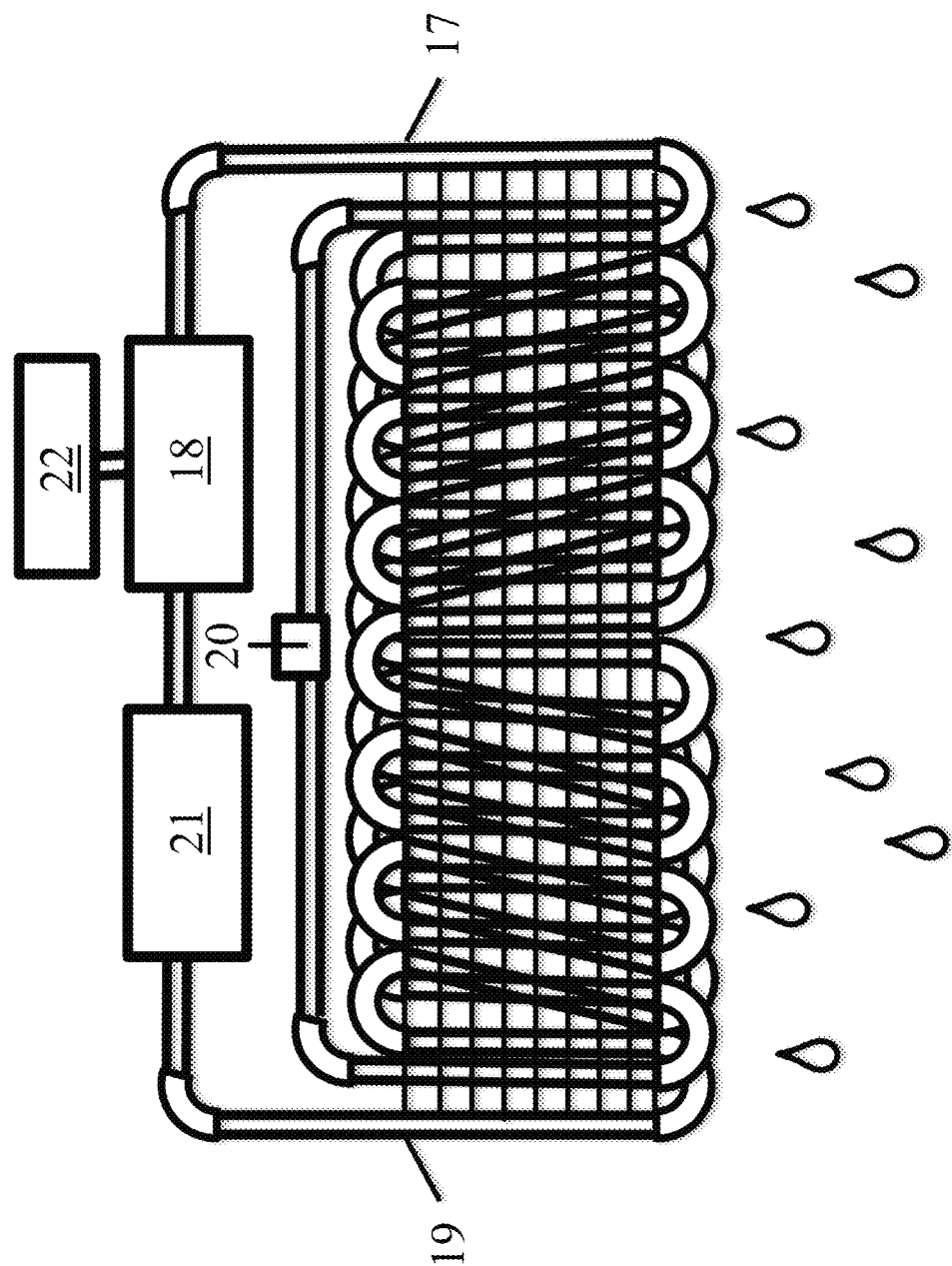
FIG. 2 illustrates another embodiment utilizing a single refrigeration circuit configuration where the condenser line and evaporator line work in tandem.

In another embodiment illustrated in FIG. 2, a single refrigeration circuit that utilizes its own condenser and evaporator line segments to capture ambient water vapor from the atmosphere. Condenser line 17 descends from compressor 18 and is dimensioned to fit intertwined with evaporator line 19. The condenser line then separates from the combined tubing configuration and continues to expansion valve 20 where it meets evaporator line 19. The evaporator line then runs back into then out of the combined tubing configuration where it connects to accumulator 21. From the accumulator the tube loop component runs back to compressor 18. The proximate location of the evaporator line to the condenser line facilitates the captured water to collect then immediately run off without an intermittent stage of freezing then thawing. Also illustrated is the hygrometer/transfer switch 22.

Figure 3:
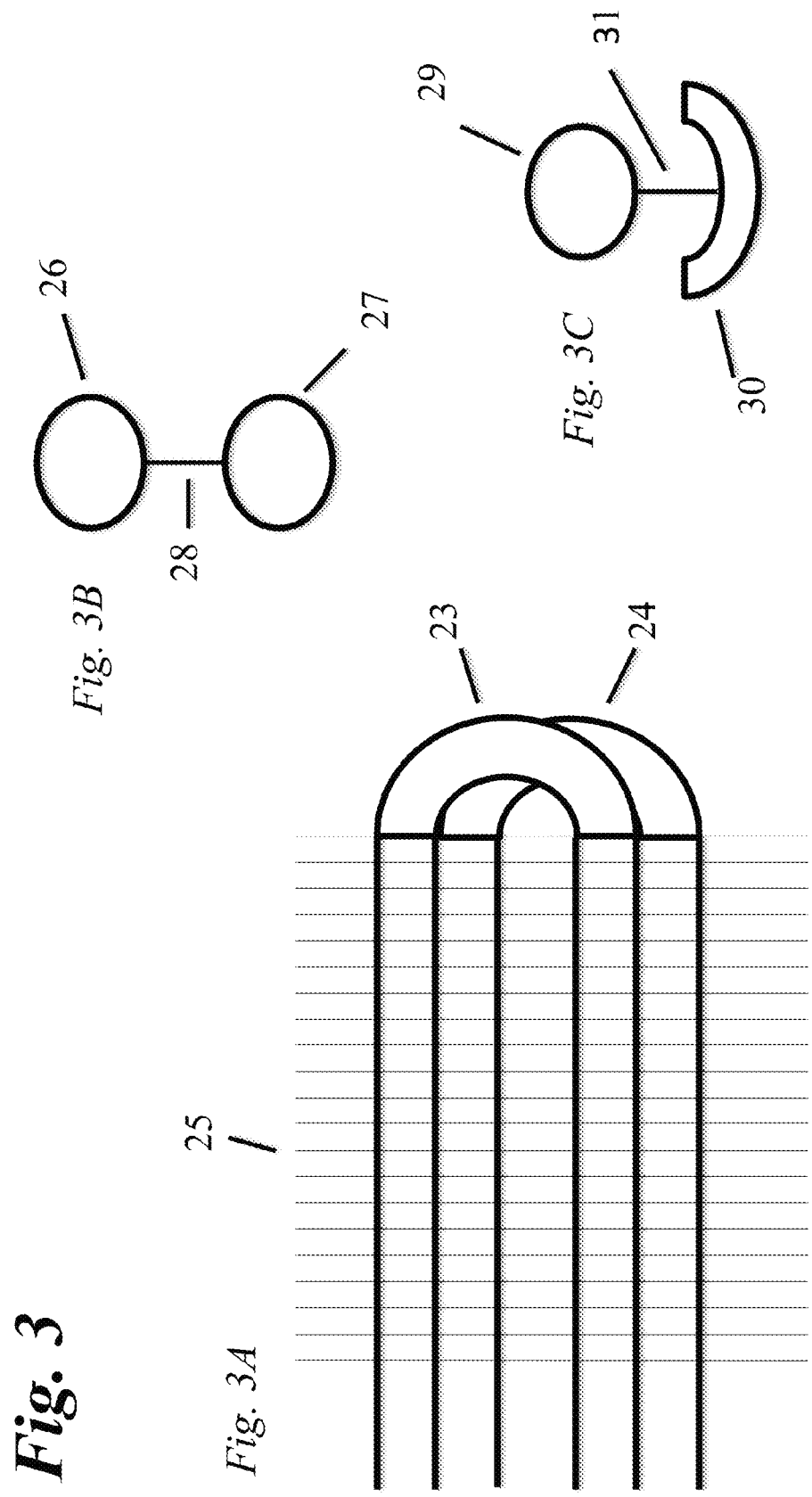
FIG. 3A is a side view section of a condenser line and an evaporator line configuration, which is illustrated in FIG. 1 and FIG. 2. Two tubes are arranged in parallel proximity and are attached by fin plates, creating the heat exchanger. It will be appreciated that each of the two tubes alternately serves as a condenser line and as an evaporator line of opposing or of the same refrigeration circuit.
FIG. 3B is a cross sectional view of two tubes arranged in parallel. Comprising a circular shaped evaporator line above a circular shaped condenser line, which is attached by a fin plate.
FIG. 3C is a cross sectional view of two tubes arranged in parallel. Comprising a circular shaped evaporator line above a crescent shaped condenser line, which is attached by a fin plate.

FIG. 3A illustrates a segmented portion of the heat exchanger configuration described in FIG. 1 and FIG. 2, which is a multiple system of refrigeration cooling and heating tubes configured in a parallel orientation. Illustrated is condenser line 23 and evaporator line 24. Also illustrated are fin plates 25, which create the heat exchanger configuration. The parallel orientation of the tubes is advantageous in placing the alternately warm and chilled in close proximity, thereby increasing the efficiency of the tubes melting the frost or, in turn, chilling the air to produce frost from the ambient water vapor. (It will be appreciated that water will also condense or freeze on the fin plates when the heat exchanger is operating.)

FIG. 3b illustrates a cross sectional view of a circular shaped evaporator line 26 above a circular shaped condenser line 27, which is attached by a fin plate 28. (It will be appreciated that this illustration would be most applicable in a concentric helically shaped heat exchanger design.)

FIG. 3C illustrates a cross sectional view of a circular shaped evaporator line 29 above a crescent shaped condenser line 30, which is attached by a fin plate 31. This configuration is to facilitate water run-off in an efficient manner as to not fall on to the evaporator line segment below. (It will be appreciated that this illustration would be most applicable in a concentric helically shaped heat exchanger design. It will also be appreciated that both the condenser and evaporator lines could be crescent shaped.)

Figure 4:
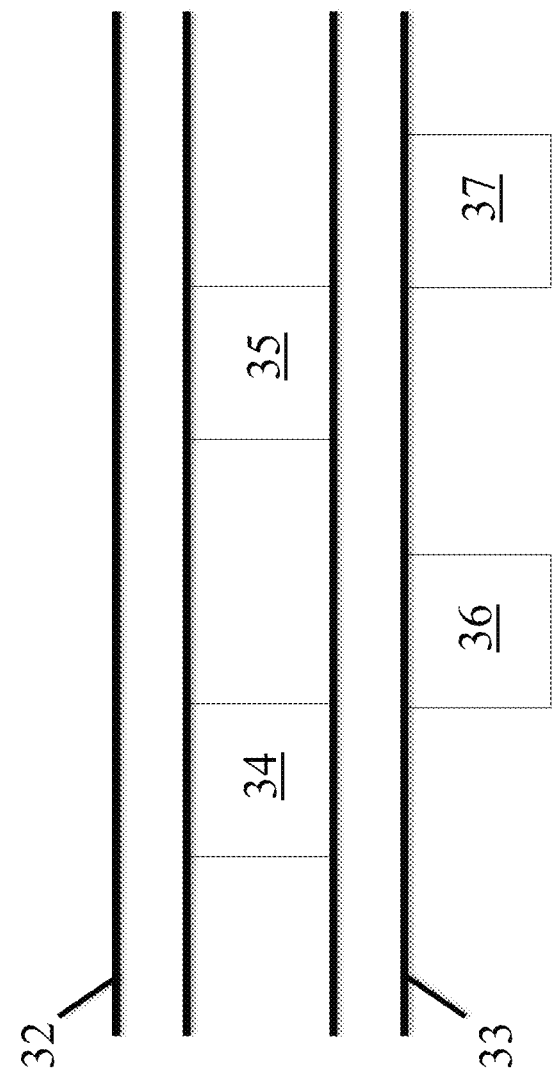
FIG. 4 is a side view of two tubes arranged in parallel, comprising an evaporator line above a condenser line, which are connected by fin plates. Such arrangements are illustrated in FIG. 3B and FIG. 3C. Additional fin plates extending under the condenser line are to connect with the opposing evaporator line positioned below.

FIG. 4 illustrates a side view of evaporator line 32 above condenser line 33, which in turn are connected by fin plates 34 and 35. Both lines are of the same refrigeration circuit. The size of the fin plates and the distance between fin plates is vital in producing the most effective heat transfer between the evaporator and condenser lines, while at the same time allowing air to permeate the heat exchanger. To facilitate additional heat transfer, fin plates 36 and 37 connected to the bottom of condenser line 33 are to connect with the opposing refrigeration circuit's evaporator line positioned below. (It will be appreciated that this illustration would be most applicable in a concentric helically shaped heat exchanger design.)

Figure 5:
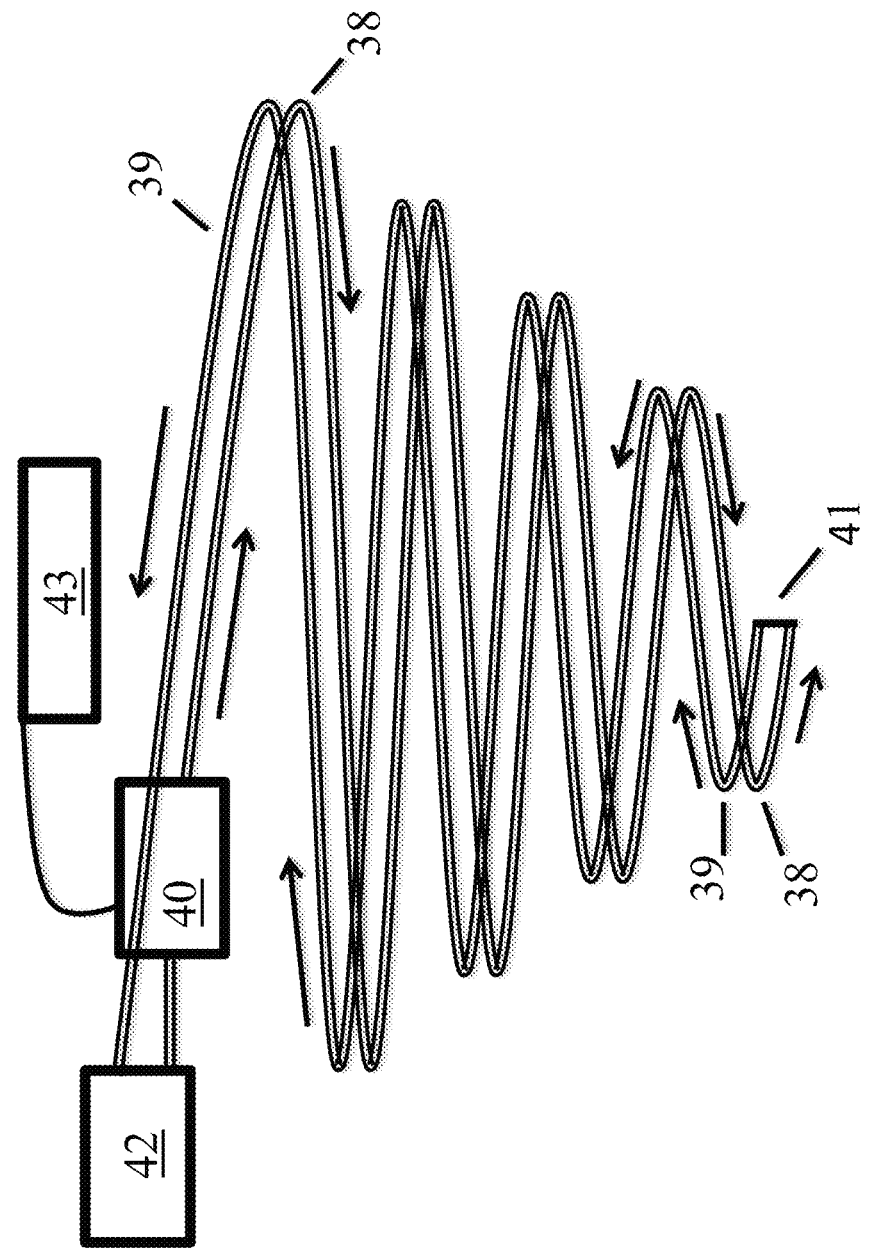
FIG. 5 is a front view of a concentric helically shaped single circuit/single heat exchanger of the disclosure.

In another embodiment, FIG. 5 illustrates a single refrigeration circuit (or tube loop component) of a concentric helically shaped heat exchanger. This design provides an alternative configuration of a single intertwined refrigeration circuit. Condenser line 38 is positioned below and runs parallel proximity to evaporator line 39. The refrigeration circuit's circulation (represented in the drawing by the directional arrows) starts at a compressor 40 extending to condenser line 38 and flows down in a concentric helically manner to expansion valve 41, which continues to evaporator line 39. From the evaporator, the tube loop component extends upward to accumulator 42 and back to compressor 40. Also shown is the hygrometer/transfer switch 43, which controls and powers this system.

Figure 6:
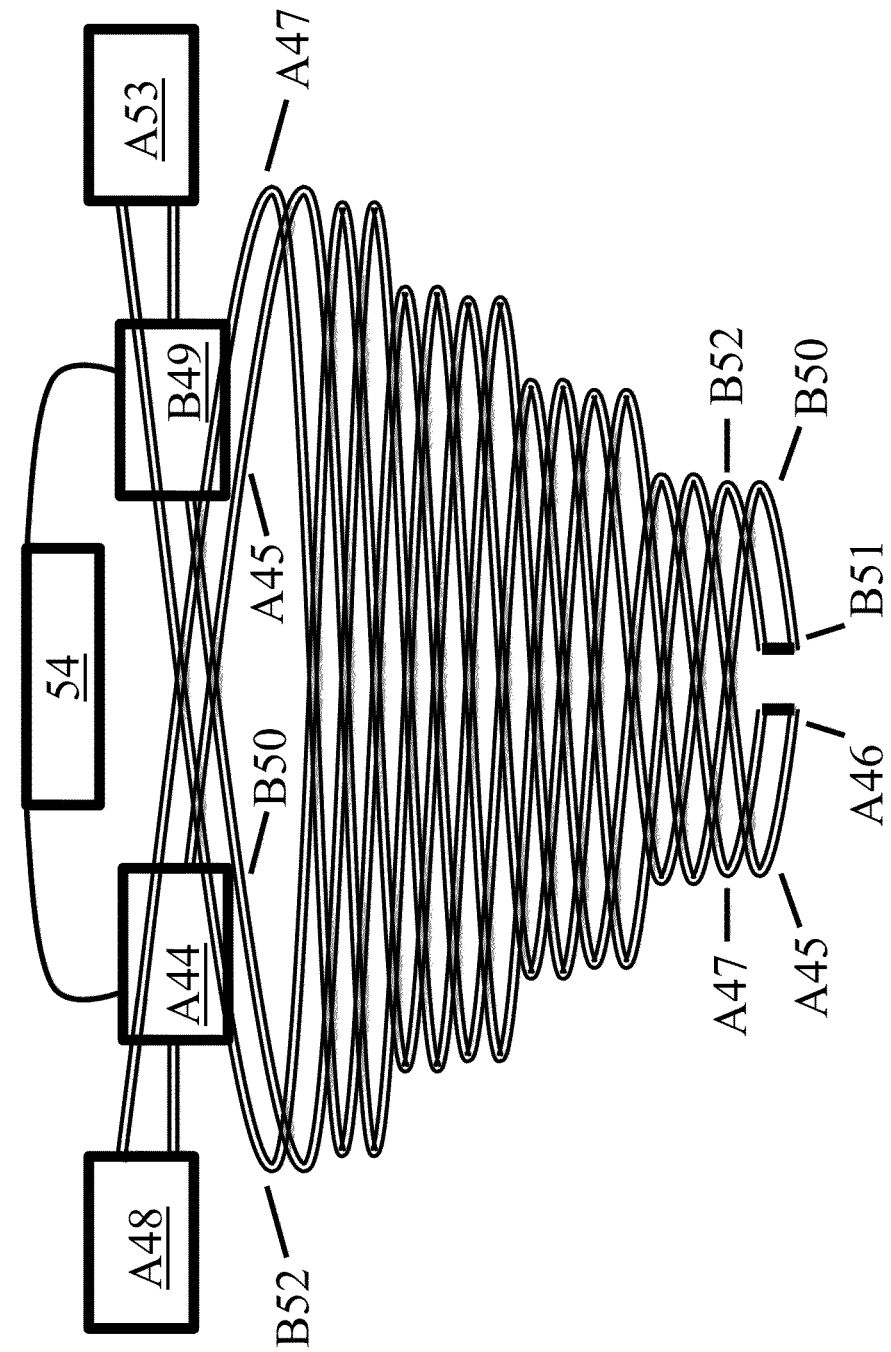
FIG. 6 is a front view of a concentric helically shaped dual circuit/single heat exchanger of the disclosure.

In another embodiment illustrated in FIG. 6, two refrigeration circuits are utilized to make up a single concentric helically shaped heat exchanger where the condenser line is positioned below and runs parallel to the evaporator line of the same refrigeration circuit. This design provides an alternative configuration of dual intertwined alternating refrigeration circuits. The first refrigeration circuit comprises of compressor A44, condenser line A45, expansion valve A46, evaporator line A47 and accumulator A48. The second refrigeration circuit comprises compressor B49, condenser line B50, expansion valve B51, evaporator line B52 and accumulator B53. Both the first and second refrigeration circuits are controlled and powered by the hygrometer/transfer switch 54. Each condenser line is positioned proximate to the separate evaporator line of the opposing refrigeration circuit below. Fin plates (which are not shown) connect condenser line A45 to evaporator line A47 and condenser line B50 to evaporator line B52. As described in FIG. 4, to increase heat transfer (heat exhausting) between the two refrigeration circuits, fin plates also connect condenser lines A45 and B50, to the opposing evaporator lines B52 and A47, which are positioned below. Depending on atmospheric conditions the hygrometer 54 determines the rate of speed in which it alternates the power supply to each refrigeration circuit. To maximize water production, the hygrometer can also alternate each refrigeration circuit one at a time or both refrigeration circuits at the same time.

Figure 8:
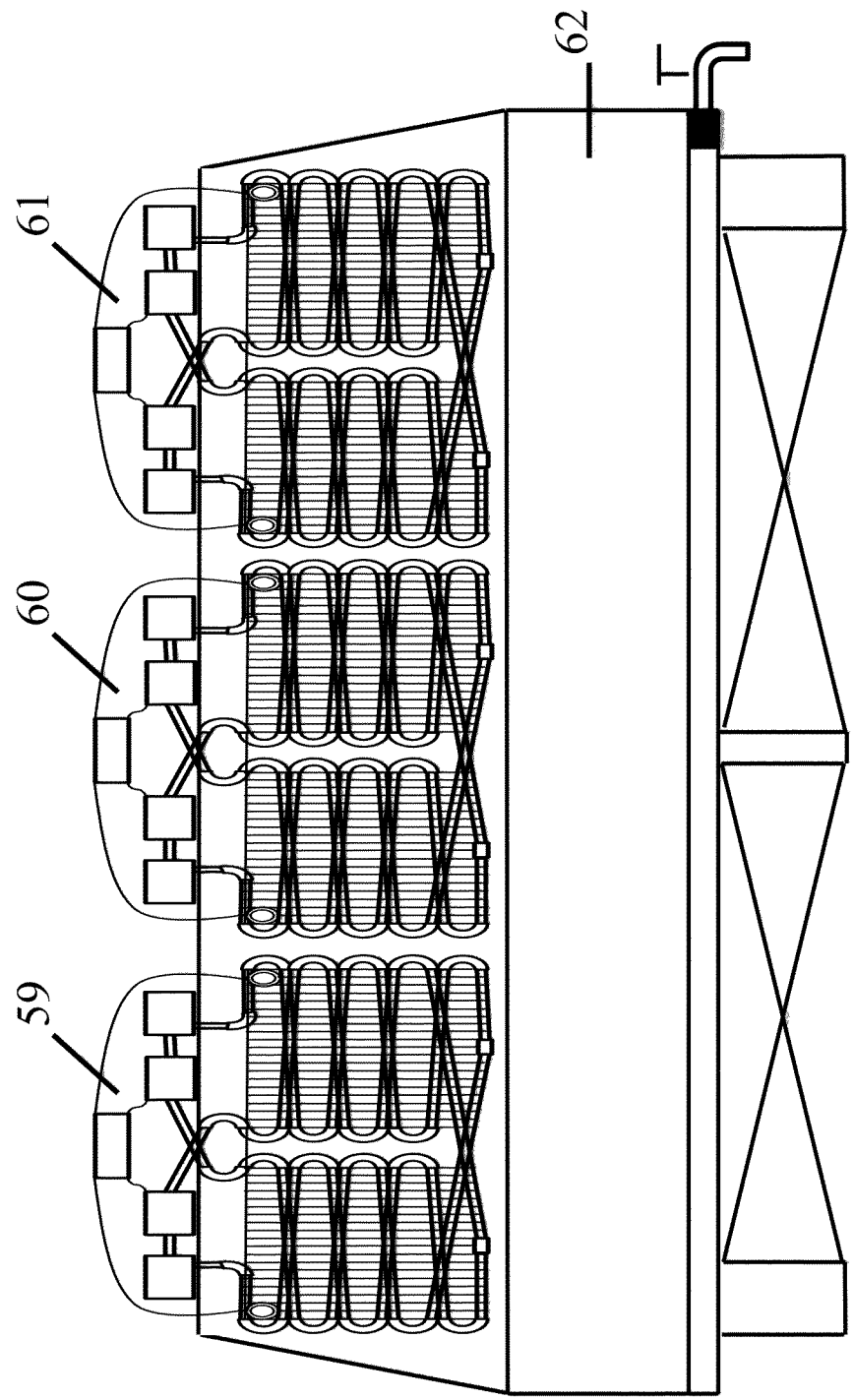
FIG. 8 illustrates the invention comprising a plurality of heat exchangers described in FIG. 1 positioned over a reservoir tank.

FIG. 7A illustrates the scalability of embodiment 55 of the invention also depicted in FIG. 1 and described above. Also illustrated is reservoir 56 to collect the captured water run-off from the heat exchangers. FIG. 7B illustrates the scalability of embodiment 57 of the invention depicted in FIG. 6 with the addition of a water reservoir 58 to collect the captured water run-off from the heat exchanger. FIG. 8 illustrates a plurality of the apparatus of the invention 59, 60, 61 positioned over a water reservoir 62.

Though effective in most regions, its efficiency is dependent on humidity level, barometric pressure and temperature. The most adequate environment for this device is in areas with high to moderate humidity levels and temperatures. It may prove inadequate in areas with constantly low temperatures, which in turn have constantly low humidity levels. In warmer drier climates, it can still be utilized at night when relative humidity levels are at their highest. However the electrical cost of producing the water may be higher than the cost of water in that region. This can be bypassed by utilizing green energy such as solar cells or wind turbines to power the device. It will also be appreciated that the energy can be utilized for the simultaneous cooling or refrigeration of products or foodstuffs.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

What is claimed is:

1. An atmospheric water collection heat exchange device for capturing water vapor from ambient air to produce water comprising:
   (a) at least a first and second separate refrigeration circuit including hollow tubes for conveying separate flows of refrigerant fluid wherein the fluid flow of the first separate refrigeration circuit can travel in an opposite direction of the flow of fluid of the second separate refrigeration circuit and each first and second separate refrigeration circuit is in communication with a fluid transfer switch that can change and control the direction of fluid flow in each of the first separate refrigeration circuit and the second separate refrigeration circuit;
   (b) a condenser and evaporator for each of the first and second separate refrigeration circuits wherein the condenser of the first circuit is intertwined with the evaporator of the second circuit and the evaporator of the first circuit is intertwined with the condenser of the second circuit and the heat may be conveyed between the first refrigeration separate circuit and the second separate refrigeration circuit, and each separate refrigeration circuit comprises:
  (i) at least one compressor adopted to push the refrigerant fluid through a condenser section;
  (ii) at least one condenser section wherein the refrigerant fluid is compressed and temperature elevated;
  (iii) at least one expansion valve adapted to convey the compressed refrigerant fluid into a evaporator section wherein the refrigerator fluid expands and the fluid temperature decreases;
  (iv) at least one evaporator section wherein the decreased fluid temperature absorbs heat from water vapor of ambient air and the water vapor condenses on an exterior tube wall of the evaporator section;
  (v) at least one accumulator;
(c) the condenser section of each at least one first and second separate refrigeration circuit is dimensioned to fit proximate to or be intertwined with the evaporator section of each other first and second separate refrigeration circuit; and
(d) the fluid transfer switch is adopted to serially operate each separate refrigeration circuit.

2. The device of claim 1 further comprising a water collection tank.

3. A system for collecting ambient water vapor comprising
  (a) a first tube loop component in fluid flow communication with and extending from a first compressor to a first accumulator wherein the first tube loop component is also in fluid flow communication with and contains a first condenser section, a first expansion valve and a first evaporator section;
  (b) a second tube loop component in fluid communication with and extending to a second compressor to a second accumulator wherein the second tube loop component is also in fluid communication with and contains a second condenser section, a second expansion valve and a second evaporator section wherein the second condenser section is intertwined with the first evaporator section to achieve heat transfer between the first evaporator section and the second condenser section and the second evaporator section is intertwined with the first condenser section to achieve heat transfer between the second evaporator section and the first condenser section, and
  (c) wherein the first loop component and second loop component are serially activated by a transition transfer switch.

4. The system of claim 3 further comprising a water collection tank position beneath the first and second evaporator section.

5. The system of claim 1 further comprising heat exchanger components dimensioned to fit within a collection tank.

6. A method for extracting water vapor from ambient air using multiple tube loop components, compressors and accumulators comprising:
  (a) activating a first compressor to push compressed gas through a first tube;
  (b) exhausting heat from a wall of the first tube proximate to a evaporator section of a second tube;
  (c) pushing the compressed gas through an expansion valve into a first evaporator section of the first tube;
  (d) pushing the gas fluid through the first evaporator section and into the first accumulator and to the first compressor;
  (e) activating a second compressor to push compressed gas through second tube positioned proximate to the first tube;
  (f) exhausting heat from a wall of the second tube to the wall of the evaporator section of the first tube;
  (g) pushing the compressed gas through an expansion valve into a second evaporator section of the second tube; and
  (h) pushing the gas through the second evaporator section and into the second accumulator and to the second compressor.

7. The method of claim 6 further comprising using a temperature activated switch to control activation and deactivation of each compressor.

8. The method of claim 6 further comprising using thermal conductivity sensors to control activation and deactivation of each compressor.

9. The method of claim 7 further comprising using a collection tank to hold water melted from the first and second evaporator sections.

10. The method of claim 6 further comprising crescent shaped tubes to channel water.

11. The method of claim 6 further comprising connecting the second tube to the wall of the evaporator section of the first tube with fin plates to transfer heat.

* * * * *